(12) United States Patent
Hilmer et al.

(10) Patent No.: US 8,633,283 B2
(45) Date of Patent: Jan. 21, 2014

(54) PROCESS FOR PRODUCING BLENDS MADE OF POLYLACTIDES (PLAS) AND OF THERMOPLASTIC POLYURETHANES (TPUS)

(75) Inventors: Klaus Hilmer, Marl (DE); Kai Brüning, Sulingen (DE); Hans-Gerhard Fritz, Uhingen (DE); Alina Corina Zgaverdea, Stuttgart (DE)

(73) Assignee: BASF SE, Ludwigshafen (DE)

( * ) Notice: Subject to any disclaimer, the term of this patent is extended or adjusted under 35 U.S.C. 154(b) by 64 days.

(21) Appl. No.: 13/160,843

(22) Filed: Jun. 15, 2011

(65) Prior Publication Data

US 2011/0306719 A1    Dec. 15, 2011

Related U.S. Application Data

(60) Provisional application No. 61/354,752, filed on Jun. 15, 2010.

(51) Int. Cl.
*C08G 63/91* (2006.01)

(52) U.S. Cl.
USPC ............ 525/415; 525/410; 525/450; 525/454

(58) Field of Classification Search
USPC .................................. 525/410, 415, 450, 454
See application file for complete search history.

(56) References Cited

U.S. PATENT DOCUMENTS

| | | | |
|---|---|---|---|
| 5,695,884 A | 12/1997 | Ishimaru et al. | |
| 6,395,833 B1 | 5/2002 | Tasaka et al. | |
| 2006/0121812 A1 | 6/2006 | Suzuki et al. | |
| 2006/0141883 A1 | 6/2006 | Nishiguchi et al. | |
| 2006/0147695 A1* | 7/2006 | Serizawa et al. ........... 428/297.4 |
| 2007/0161731 A1 | 7/2007 | Carvalho et al. | |
| 2010/0105842 A1* | 4/2010 | Hilmer .......................... 525/452 |

FOREIGN PATENT DOCUMENTS

| | | | |
|---|---|---|---|
| DE | 196 07 870 A1 | 9/1997 | |
| DE | 196 49 290 A1 | 6/1998 | |
| DE | 197 06 452 A1 | 8/1998 | |
| DE | 10 2006 009 096 A1 | 9/2007 | |
| EP | 0 308 683 A1 | 3/1989 | |
| EP | 0 515 203 | * 5/1992 | ............. C08L 67/04 |
| EP | 0 670 339 A1 | 9/1995 | |
| EP | 1 679 349 A1 | 7/2006 | |
| EP | 1 826 225 A2 | 8/2007 | |
| JP | 5-163431 | 6/1993 | |
| JP | 2008-308599 | 12/2008 | |
| WO | WO 00/51660 | 9/2000 | |
| WO | WO 2008/116801 | * 10/2008 | ............. C08G 18/08 |
| WO | WO 2009/022076 A2 | 2/2009 | |

* cited by examiner

*Primary Examiner* — Robert Jones, Jr.
(74) *Attorney, Agent, or Firm* — Oblon, Spivak, McClelland, Maier & Neustadt, L.L.P.

(57) ABSTRACT

Blends made of thermoplastic polyurethanes (TPUs) and of polylactides (PLAs) are produced via A) reaction of at least one thermoplastic polyurethane with at least one diisocyanate or one diisocyanate prepolymer which has at least two isocyanate groups, or a mixture thereof, in the melt, with reduction of the molar mass of the thermoplastic polyurethane and with formation of a thermoplastic polyurethane having an excess of isocyanate end groups, B) introduction of at least one polylactide into the melt of the stage A) product, and reaction of the stage A) product with the polylactide at a temperature below 190° C., C) cooling of the resultant blend, where no polyols are used in stages A) to C).

14 Claims, 1 Drawing Sheet

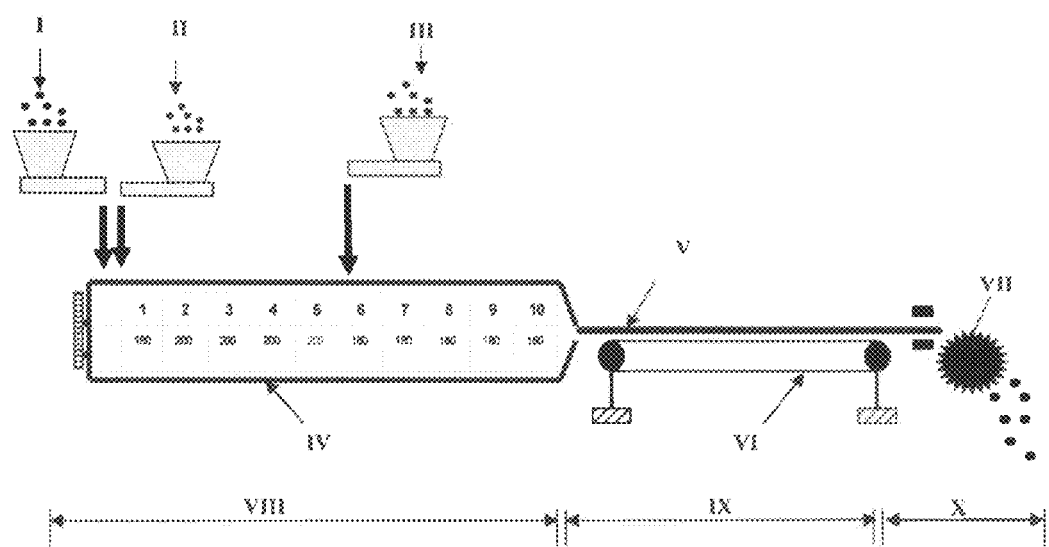

PROCESS FOR PRODUCING BLENDS MADE OF POLYLACTIDES (PLAS) AND OF THERMOPLASTIC POLYURETHANES (TPUS)

The invention relates to a process for producing blends made of polylactides and of thermoplastic polyurethanes, to blends thus obtained, and also to sheet products and moldings produced from these blends.

Polylactic acid or polylactide (PLA) is a thermoplastic that can be obtained from renewable raw materials and that therefore complies with the requirement for sustainable production of polymer materials. PLA materials derive from a polycondensation reaction based on lactic acid or from a ring-opening polymerization reaction based on lactide, which is the dimer of lactic acid. In the latter synthesis route, the starting material is L-lactide or a mixture of L- and D-lactides, which are the stereoisomers of lactide. The poly-L-lactide (PLLA) synthesized from L-lactide is a very hard and brittle material with a modulus of elasticity E of about 4000 MPa. However, greater flexibility and ductility are desirable for many applications. Feedstock producers are responding to this desire by using an L-/D-lactide mixture (e.g. 92:8%) as starting material for polymerization of PLDA lactides, but as the proportion of D-lactide increases here, the crystallite melting point and the crystallization rate fall dramatically. This leads to marked impairment of service properties.

Polyurethanes, and in particular thermoplastic polyurethanes, have been known for a long time and are used in a wide variety of applications. By way of example, polyurethanes are used in the shoe industry and automobile industry, for foils, and cable sheathing, and in leisure products, and also are used in a variety of ways as a component in blends.

It is known per se that polylactides can be compounded with polyurethanes to give blends.

EP-A 1 679 349 relates to polymer compositions which comprise, alongside polylactides, specific polyurethanes which comprise polyetherdiols as alcohol component. By way of example, poly(ethyl vinyl ethers) having terminal hydroxy groups are involved. In the production process, these specific poly(ethyl vinyl ethers) are reacted, for example in an extruder, with polylactides and with diisocyanates. Some of the foils obtained here were transparent and colorless.

JP-A-2008 308599 relates to polymer powders which comprise polylactides. To produce these, polylactide polymers and polymer polyols are mixed and then reacted with diisocyanate. Examples of polymer polyols that can be used are polyetherdiols, polyesterdiols, and polysiloxane glycols, and also polybutadiene glycol.

WO 2009/022076 relates to thermoplastic materials which can be postcrosslinked, after a shaping process has been carried out. By way of example, polyesters can be simultaneously introduced into an extruder together with polyol and diisocyanate. Polylactides are among the polar thermoplastic polymers that are mentioned for possible use.

The property profile of the resultant systems is not suitable for all applications. In particular, the brittleness of the polylactide and its low melting point frequently lead to non-ideal performance characteristics. Polymer processes therefore consider it important that the mechanical properties of the blends, in particular the modulus of elasticity and the extensibility, can be adjusted appropriately and precisely to the respective application.

It is an object of the present invention to provide blends made of polylactides (PLAs) and of thermoplastic polyurethanes (TPUs) which exhibit improved toughness with reduced brittleness, and which moreover have increased tensile strain at break values, with adequate strength. The blends are in particular intended to be suitable for producing sheet products (thin foils, sheets, etc.), moldings, and extruded semifinished products (pipes, profiles, etc.).

In particular, the intention is to find a process which, in the context of an upstream or integrated compounding process, i.e. in a single-stage process, allows plastics processes to achieve precise appropriate adjustment of the modulus of elasticity of the PLA formulation to the respective final product, without any adverse alteration of the actual properties of the PLA. The intention is that the compounding modification be achieved via incorporation of a flexibilizer. The primary object here is to find, for the two polymeric thermoplastic components, namely the PLA and the flexibilizer, an efficient compatibilization strategy, or a viable compatibilization concept, which excludes delamination of the blend components on exposure to any external stress or to the action of any media, and which prevents phase separation during the course of blend processing or in a stressed component.

These blends, composed of PLA and of a flexibilizer, are intended to feature improved toughness, reduced brittleness, and also increased tensile strain at break, in comparison with straight PLA or poly-L-lactide (PLLA).

They are also intended to have increased notched impact resistance and puncture resistance, and moreover to ensure better deformability, and also shorter cycle times.

They are intended to be capable of shaping by the familiar methods of plastics processing methods, e.g. extrusion, injection molding, blow molding, compression molding, rotational sintering, and thermoforming, to give semifinished products and moldings.

The invention achieves the object via a process for producing blends made of polylactides (PLAs) and of thermoplastic polyurethanes (TPUs), via Stage A) reaction of at least one thermoplastic polyurethane with at least one diisocyanate or one isocyanate prepolymer which has at least two isocyanate groups, or a mixture thereof, in the melt, with reduction of the molar mass of the thermoplastic polyurethane and with formation of a thermoplastic polyurethane having an excess of isocyanate end groups, Stage B) introduction of at least one polylactide into the melt of the stage A) product, and reaction of the stage A) product with the polylactide at a temperature below 190° C., more preferably below 185° C., and particularly preferably below 180° C.

Stage C) cooling of the resultant blend, where no polyols are used in stages A) to C).

The object is further achieved in that reinforcing materials (a very wide variety of fibers and/or acicular or lamellar materials (e.g. wollastenite, mica, talc, etc.) are compounded into the blends composed of polylactides (PLAs) and of thermoplastic polyurethanes (TPUs). The PLA/TPU blends of the invention are two-phase materials in which the PLA represents the continuous phase and the TPU represents the disperse phase.

The object is further achieved via the use of the blends described above for producing sheet products, extruded semifinished products, or moldings. The invention also provides foils or moldings made of a corresponding blend, in which more preferably reinforcing materials have been compounded, and also provides moldings and semifinished products produced therefrom.

Surprisingly, it has been found possible to produce blends made of thermoplastic polyurethanes and of polylactides with improved performance characteristics if a thermoplastic polyurethane is reacted first with a diisocyanate or with a prepolymer which has at least two isocyanate groups, or with a mixture thereof, in the melt, in order to reduce the molar mass of the thermoplastic polyurethane. The relatively short-chain thermoplastic polyurethane thus formed, having an excess of isocyanate end groups, can then be reacted with the polylactide, after this has been introduced and melted, whereupon covalent bonds are formed with the isocyanate end groups. The result is excellent compatibilization of the two polymer phases, and also excellent morphological stability. The property profile can be adjusted in a controlled manner for the respective application via the formulation of the entire system and the conduction of the process. The blends produced in the invention have reduced brittleness in comparison with the unblended polylactide. Toughness, elongation at break, and impact resistance are increased significantly.

The object is in particular achieved in that the flexibilizers used comprise thermoplastic polyurethanes (TPUs) which are covalently linked to the PLA or PLLA in a reactive compounding process. As mentioned, this gives two-phase materials in which the PLA forms the continuous phase and the TPU forms the discontinuous or disperse phase. This type of morphology is preferably obtained when the PLA:TPU ratios by mass in which the two main components are mixed with one another are from 97:3 to 50:50% by weight. The reactive blending process is preferably carried out in twin-screw extruders or in BUSS cokneaders, or in similar plastics-compounding assemblies.

BRIEF DESCRIPTION OF THE DRAWINGS

FIG. 1 shows a preferred compounding process in a twin-screw extruder (IV), which is preferably a Coperion ZSK 25 (L/D=42) from the manufacturer Werner & Pfleiderer. TPU (I) is introduced with solid and/or liquid additives (II) into the extruder (IV).

In one preferred embodiment, the extruder (IV) has various temperature regions 1 to 10 which have been set to the following temperatures: 1: 180° C., 2: 200° C., 3: 200° C., 4: 200° C., 5: 200° C., 6: 180° C., 7: 180° C., 8: 180° C., 9: 180° C., 10: 180° C. It is preferable that the manner in which the PLA regrind (III) is introduced into the extruder is such that the temperature in the extruder is below 190° C. The compounding material (V) composed of TPU and of PLA is cooled by an air cooler (VI) before it is comminuted by a pelletizer (VII) to give thermoplastic pellets. The region of compounding (VIII) is the region indicated by the double-headed arrow (VIII), and the cooling takes place in the region indicated by the double-headed arrow (IX), and the pelletization takes place in the region of the double-headed arrow (X).

The process of the invention for producing PLA/TPU blends is characterized via three steps in the process, also termed stage A, B and C Stage A) The first substep of the process involves the reaction of at least one thermoplastic polyurethane of at least one diisocyanate or one prepolymer which has at least two isocyanate groups, in the melt, with reduction of the molar mass of the thermoplastic polyurethane, with an excess of isocyanate end groups.

One particularly suitable prepolymer formulation can be composed of NCO-terminated polyesters and of bifunctional isocyanates (e.g. MDI).

Stage B) The second substep of the process involves the incorporation of a polylactide (PLA) into the melt of the product from step A of the process, and the reaction of the product of A with the polylactide at a temperature of less than 190° C., preferably less than 185° C., and particularly preferably less than 180° C.

The compatibilization of the two polymer components takes place via linkage of the chain fragments formed in step A of the process to the polylactide units respectively bearing an OH end group.

Stage C) The third substep of the process comprises the shaping and cooling, or the pelletization, of the PLA/TPU blend.

It has been found possible to produce polymer blends made of polylactides and of thermoplastic polyurethanes with properties adapted to the final product if a thermoplastic polyurethane is first reacted with a diisocyanate or with a prepolymer which had at least two isocyanate groups, or with a mixture thereof, in the melt, in order to reduce the molar mass of the thermoplastic polyurethane, preferably at temperatures above 140° C. The resultant relatively short-chain thermoplastic polyurethane having an excess of isocyanate end groups can then, on introduction of the PLA, react with the OH end groups of the polylactide, whereupon covalent bonds are formed with the NCO groups. There are therefore covalently coupled polylactide chains and polyurethane chains present in the polymer blend produced.

The blends of the invention, the properties of which can be appropriately adjusted in a variable manner via formulation and process, are therefore particularly suitable for producing thin foils, for example those used for packaging and those used for trash bags.

It is moreover also possible to produce moldings from the blends, for example for engineering components, household articles, or toys, these then also being preferred embodiments.

The object is further achieved via use of the two-phase materials described above for producing extruded semifinished products, injection moldings, or compression moldings, and components produced by rotational molding.

In preferred embodiment, the compounding process can use fibers of any type. This provides access to a further range of property profiles. When the fiber-reinforced blend is shaped directly (in a single-stage process), there is no requirement for any additional processing step which subjects the material to thermal degradation. Preferred glass fibers are glass fibers, natural fibers (flacks, hemp, cotton, sisal, bamboo, kenaf, and also cellulose fibers, etc.). The proportion in the compounded material is preferably more than 1% by weight, particularly preferably from 5% by weight to 30% by weight.

The properties of the material and the performance characteristics can be further modified via the chemical structure of the thermoplastic polyurethanes used. By way of example, thermoplastic polyurethanes can be produced from renewable raw materials, preferably sebacic acid, and from polyols.

It is possible to use thermoplastic polyurethanes which have no aromatic groups. The two variants can be linked, so that the underlying polyol of the TPU is also nonaromatic and is based on renewable raw materials.

Improved hydrolysis resistance can be achieved via use of polyetherdiols in the thermoplastic polyurethane. A corresponding polyether prepolymer exhibits markedly improved hydrolysis resistance.

Suitable qualitative proportions of polylactide with respect to thermoplastic polyurethane can be set in the process of the invention. It is preferable that the proportion of the polylactide in the mixture of stage B) is from 50% by weight to 97% by weight, particularly from 60% by weight to 92% by weight.

In stage A), any desired suitable amounts of a diisocyanate or of a diisocyanate prepolymer, in each case having at least two isocyanate groups, or a mixture thereof, can be introduced into the thermoplastic polyurethane. The proportion of diisocyanate or prepolymer, or mixture of these, is preferably from 1% by weight to 25% by weight, particularly from 1% by weight to 10% by weight, based on the stage A) product.

One particularly suitable prepolymer formulation is based on NCO-terminated polyesters and on bifunctional isocyanates, e.g. MDI, which is preferred The reactions in stages A), B), and C) can be carried out continuously or batchwise.

Preference is given to a continuous process which in particular takes the form of reactive extrusion. This process is carried out in an extruder, preferably in a twin-screw extruder, where the thermoplastic polyurethane and the diisocyanate or isocyanate prepolymer, or a mixture thereof, is added at the inlet of the extruder, while the polylactide is added downstream.

The process of the invention can use any desired suitable thermoplastic polyurethanes (TPUs), where these are generally obtainable from at least one diisocyanate, from at least one polyol, and frequently from at least one isocyanate-reactive chain extender.

Thermoplastic polyurethanes TPUs are polyurethanes which, within a certain temperature range, can be repeatedly softened by heating, and on cooling solidify, and while in the softened state, can be repeatedly molded via casting, injection molding, extrusion, blow molding, compression molding, and rotational sintering, to give semifinished products or moldings. TPUs are multiple block copolymers; within one molecule, these have hard and soft segments. In one preferred embodiment, the proportion of the hard phase in an aliphatic TPU, based on the entire TPU, is preferably from 15% by weight to 65% by weight, in particular from 40% by weight to 65% by weight.

The invention produces the thermoplastic polyurethanes via reaction of diisocyanates, which are also termed component a), with polydiols and optionally with further compounds which are reactive toward isocyanates and all of which are termed component b), and with chain extenders, which are also termed component c), optionally in the presence of catalysts, which are also termed component d), and/or conventional auxiliaries, which are also termed component e). The production process can preferably use polyaddition in the conventional continuous processes or else as an alternative can take place batchwise.

The components a), b), c), and also optionally d) and/or e) usually used in producing the polyurethanes will be described by way of example below:

a) organic isocyanates, component a), used can comprise well-known aromatic, aliphatic, cycloaliphatic, and/or araliphatic isocyanates, preferably diisocyanates, more preferably diphenylmethane 2,2'-, 2,4'-, and/or 4,4'-diisocyanate (MDI), naphthylene 1,5-diisocyanate (NDI), tolylene 2,4- and/or 2,6-diisocyanate (TDI), diphenylmethane diisocyanate, 3,3'-dimethyldiphenyl diisocyanate, 1,2-diphenylethane diisocyanate, and/or phenylene diisocyanate, tri-, tetra-, penta-, hexa-, hepta-, and/or octamethylene diisocyanate, 2-methyl-pentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1-isocyanato-4-[(4-isocyanatocyclohexyl)methyl]cyclohexane (H12MDI), 2,6-diisocyanatohexanecarboxylic ester, 1,4- and/or 1,3-bis(isocyanatomethyl)cyclohexane (HXDI), cyclohexane 1,4-diisocyanate, 1-methylcyclohexane 2,4- and/or 2,6-diisocyanate, and/or dicyclohexylmethane 4,4'-, 2,4'-, and 2,2'-diisocyanate, preferably diphenylmethane 2,2'-, 2,4'-, and/or 4,4'-diisocyanate (MDI), naphthylene 1,5-diisocyanate (NDI), tolylene 2,4- and/or 2,6-diisocyanate (TDI), hexamethylene diisocyanate, 1-isocyanato-4-[(4-isocyanatocyclohexyl)methyl]cyclohexane, and/or IPDI.

Particularly preferred isocyanates are aliphatic isocyanates, more preferably hexamethylene diisocyanate and in particular H12MDI.

b) Compounds, component b), which are reactive toward isocyanates and which can be used are the well-known compounds reactive toward isocyanates, examples being polyesterols, polyetherols, and/or polycarbonatediols, for which the collective term "polyols" is also usually used, with molar masses (Mn), preferably number-average molar masses, from 500 [g/mol] to 8000 [g/mol], preferably from 600 [g/mol] to 6000 [g/mol], in particular from 800 [g/mol] to less than 3000 [g/mol], and preferably with average functionality of from 1.8 to 2.3 with respect to isocyanates, preferably from 1.9 to 2.2, in particular 2.

Polyether polyols are preferably used as component b), examples being those based on well-known starter substances and on conventional alkylene oxides, preferably ethylene oxide, propylene oxide and/or butylene oxide, and more preferably polyetherols based on propylene 1,2-oxide and ethylene oxide, and in particular polyoxytetramethylene glycols. The polyetherols used can preferably also comprise what are known as low-unsaturation polyetherols. For the purposes of this invention, low-unsaturation polyols are in particular polyether alcohols having less than 0.02 meq/g content of unsaturated compounds, preferably less than 0.01 meq/g. Polyether alcohols of this type are mostly produced via an addition reaction of alkylene oxides, in particular ethylene oxide, propylene oxide and mixtures thereof, onto the above-described diols or triols in the presence of high-activity catalysts.

These high-activity catalysts are preferably cesium hydroxide and multimetal cyanide catalysts, also termed DMC catalysts. A DMC catalyst used frequently and with preference is zinc hexacyanocobaltate. The DMC catalyst can be left in the polyether alcohol after the reaction, but is usually removed, for example via sedimentation or filtration.

Instead of a polyol, it is also possible to use a mixture of various polyols as component b). It is particularly preferable that the thermoplastic polyurethane of the invention is based on polytetrahydrofuran with a molar mass (Mn), preferably number-average molar mass, of from 600 g/mol to 2000 g/mol, preferably from 800 g/mol to 1400 g/mol, particularly preferably from 950 g/mol to 1050 g/mol, as component b).

c) The chain extender, component c), used can comprise well-known aliphatic, araliphatic, aromatic, and/or cycloaliphatic compounds with a molar mass, preferably average molar mass, of from 50 g/mol to 499 g/mol, preferably difunctional compounds. Examples of preferred compounds are alkanediols having from 2 to 10 carbon atoms in the alkylene radical, preferably 1,4-butanediol, 1,6-hexanediol, and/or di-, tri-, tetra-, penta-, hexa-, hepta-, octa-, nona-, and/or decaalkylene glycols having from 3 to 8 carbon atoms, more preferably unbranched alkanediols, in particular 1,3-propanediol and 1,4-butanediol.

d) Suitable catalysts, component d), which in particular accelerate the reaction between the NCO groups of the diisocyanates, component a), and component b) are the tertiary amines which are conventional and known from the prior art, preferred examples being triethylamine, dimethylcyclohexylamine, N-methyl-morpholine, N,N'-dimethylpiperazine, 2-(dimethylaminoethoxy)ethanol, diazabicyclo [2.2.2]octane, and the like, and also in particular organometallic compounds, such as titanic esters, iron compounds, e.g. preferably ferric acetylacetonate, tin compounds, e.g. preferably stannous diacetate, stannous dioctoate, stannous dilaurate, or the dialkyltin salts of aliphatic carboxylic acids, e.g. dibutyltin diacetate, dibutyltin dilaurate, or the like. The amounts usually used of the catalysts are from 0.00001 part by weight to 0.1 part by weight per 100 parts by weight of polyhydroxy compound, component b).

e) It is also possible to add conventional auxiliaries, component e), alongside catalysts, component d), to structural components a) to c). Examples that may be mentioned are blowing agents, surfactants, flame retardants, nucleating agents, lubricants and mold-release agents, dyes, and pigments, stabilizers, e.g. preferably for protection from hydrolysis, light, heat, or discoloration, inorganic and/or organic fillers, reinforcing agents, plasticizers, and metal deactivators. Preferred hydrolysis stabilizers used are oligomeric and/or polymeric aliphatic or aromatic carbodiimides.

However, one preferred embodiment uses none of these auxiliaries, or uses only an amount which is preferably, based on the thermoplastic polyurethane inclusive of the additives, at most 1%, in particular at most 0.1%.

Particular preference is given to TPUs based on hydrogenated MDI and on at least one polyetherol with a maximum proportion of 25% by weight, preferably at most 10% by weight, of aromatics and conjugated π-electron systems, based on the thermoplastic polyurethane inclusive of any additives present, in particular TPU excluding aromatic compounds.

The TPUs can be produced by the known processes, batchwise or continuously, for example using reactive extruders or the belt process, in the one-shot or prepolymer process, preferably in the one-shot process. In these processes, the reacting components a), b), and optionally c), d), and/or e) are mixed in succession or simultaneously with one another, whereupon the reaction immediately begins. In the extruder process, structural components a), b), and also optionally further components c), d), and/or e) are introduced individually or in the form of a mixture into the extruder and reacted, for example preferably at temperatures of from 100 to 280° C., more preferably at from 140° C. to 250° C., and the resultant polyurethane is then extruded, cooled and pelletized.

In order to optimize the TPUs, the polyol component, component b), and chain extender, component c), can be varied. One preferred embodiment sets a ratio by weight of from 20 to 2, in particular from 8 to 3, for polyol, component b), to the entirety of chain extenders, component c), to be used.

In one preferred embodiment, the reaction of the isocyanate, component a), with the isocyanate-reactive components b) and optionally c) takes place at an index of from 950 to 1050, particularly preferably from 970 to 1010, and in particular from 980 to 1000. The index here is defined via the ratio of the entirety of the isocyanate groups used during the reaction in component a) to the isocyanate-reactive groups, i.e. in particular groups of components b) and c). If the index is 1000, there is one active hydrogen atom for each isocyanate group of component a). If the index is above 1000, there are more isocyanate groups than OH groups.

Stabilizers can be added to the polyurethanes in order to stabilize them with respect to aging. For the purposes of the present invention, stabilizers are additives which protect a plastic or a plastics mixture from damaging effects of the environment. Examples are primary and secondary antioxidants, thiosynergists, organophosphorus compounds of trivalent phosphorus, hindered amine light stabilizers, UV absorbers, hydrolysis stabilizers, quenchers, and flame retardants. Examples of commercial stabilizers are given in Plastics Additive Handbook, 5th Edition, H. Zweifel, ed., Hanser Publishers, Munich, 2001 ([1]), pp. 98-136. If the polyurethane of the invention is exposed to thermoxidative degradation during its use, antioxidants can be added. It is preferable to use phenolic antioxidants. Examples of phenolic antioxidants are given in Plastics Additive Handbook, 5th edition, H. Zweifel, ed., Hanser Publishers, Munich, 2001, pp. 98-107 and pp. 116-121. Preference is given to those phenolic antioxidants with number-average molar mass greater than 700 g/mol. An example of a phenolic antioxidant whose use is preferred is pentaerythrityl tetrakis(3-(3,5-bis(1,1-dimethylethyl)-4-hydroxyphenyl)propionate) (Irganox® 1010), or any other relatively high-molecular-weight condensate derived from appropriate antioxidants. The concentrations used of the phenolic antioxidants are generally from 0.1% by weight to 5% by weight, preferably from 0.1% by weight to 2% by weight, in particular from 0.5% by weight to 1.5% by weight, based in each case on the total weight of the polyurethane. It is moreover preferable to use antioxidants which are amorphous or liquid. The preferred constitution of the polyurethanes of the invention may make them markedly more resistant to ultraviolet radiation than, for example, polyurethanes plasticized with phthalates or with benzoates, but a stabilizer system comprising only phenolic stabilizers is often inadequate. For this reason, when the polyurethanes of the invention are exposed to UV light they are preferably additionally stabilized with a UV absorber. UV absorbers are molecules which absorb high-energy UV light and dissipate the energy. Familiar UV absorbers used in industry are by way of example preferably members of the cinnamic ester group, of the diphenylcyanoacrylates, of the oxalamides (oxanilides), in particular 2-ethoxy-2'-ethyloxanilide, of the formamidines, of the benzylidenemalonates, of the diarylbutadienes, of the triazines, or else of the benzotriazoles. Examples of commercial UV absorbers are found in Plastics Additive Handbook, 5th edition, H. Zweifel, ed., Hanser Publishers, Munich, 2001, pages 116-122. In one preferred embodiment, the number-average molar mass of the UV absorbers is greater than 300 g/mol, in particular greater than 390 g/mol. The number-average molar mass of the UV absorbers preferably used should moreover not be greater than 5000 g/mol, and should particularly preferably not be greater than 2000 g/mol. The benzotriazoles group is particularly suitable as UV absorber. Examples of particularly suitable benzotriazoles are Tinuvin® 213, Tinuvin® 328, Tinuvin® 571, and also Tinuvin® 384, and Eversorb®82. The amounts added of the UV absorbers, based in each case on the total weight of the polyurethane, are preferably from 0.01% by weight to 5% by weight, particularly preferably from 0.1% by weight to 2.0% by weight, in particular from 0.2% by weight to 0.5% by weight. A UV stabilizer system described above, based on an antioxidant and on a UV absorber, is often still not adequate to ensure good resistance of the polyurethane of the invention to the damaging effect of UV radiation. In that case, it is also possible to add a hindered amine light stabilizer (HALS) in addition to the antioxidant and the UV absorber, to component E. One particularly preferred UV stabilizer system comprises a mixture made of a phenolic stabilizer, of a benzotriazole, and of a HALS compound, in the preferred amounts described above. However, it is also possible to use compounds which combine the functional groups of the stabilizers, for example sterically hindered piperidyl-hydroxybenzyl condensates, e.g. di(1,2,2,6,6-pentamethyl-4-piperidyl) 2-butyl-2-(3,5-di-tert-butyl-4-hydroxybenzyl)malonate, Tinuvin® 144.

Other particularly suitable materials are waxes, where these assume important functions not only during the industrial production of the polyurethanes but also during their processing. The wax serves as friction-reducing interior and exterior lubricant, thus improving the flow properties of the polyurethane. The material is also intended to act as release agents to prevent adhesion of the polyurethane to the surrounding material (e.g. the mold), and to act as dispersing agent for other additives, e.g. pigments and antiblocking agents. Examples of suitable materials are fatty acid esters, such as stearic esters and montanic esters, and metal soaps of these, and also fatty amides, such as stearylamides and oleamides, and also polyethylene waxes. An overview of the waxes used in thermoplastics is found in H. Zweifel (Ed.): Plastics Additives Handbook, 5th edition, Hanser Verlag, Munich 2001, pp. 443 ff., EP-A 308 683, EP-A 670 339, and JP-A 5 163 431.

Improvements can also be achieved via the use of combinations of esters and of amides as in DE-A 19 607 870, and via the use of specific wax mixtures of montanic- and fatty-acid derivatives (DE-A 19 649 290), and also via the use of hydroxy stearamides as in DE 102006009096 A1.

One particularly preferred embodiment uses fatty acids as in DE-A-19706452 having from 24 to 34 carbon atoms, and/or esters and/or amides of these fatty acids, in polyurethanes with a desired reduced tendency toward the absorption and/or release of substances, where the proportion by weight used of the fatty acids and/or derivatives thereof is from 0.001% by weight to 15% by weight, based on the total weight of the polyisocyanate polyaddition products.

Another preferred embodiment uses a mixture as in EP-A-1826225 made of the reaction products of alkylenediamines with a) one or more linear fatty acids, and of alkylenediamines with b) 12-hydroxystearic acid, and/or of the reaction products of alkylenediamines with c) 12-hydroxystearic acid and one or more linear fatty acids. This mixture therefore comprises the reaction products of alkylenediamine with components a) and b), and optionally c).

Further details concerning the abovementioned auxiliaries and additives can be found in the technical literature, e.g. in Plastics Additive Handbook, 5th edition, H. Zweifel, ed., Hanser Publishers, Munich, 2001. All of the molar masses mentioned in this specification have the unit [g/mol] and, unless otherwise stated, are number-average molar masses.

In another preferred embodiment, the dicarboxylic acid and/or the diol of the polyesterdiol and/or the chain extender, are of non-fossil origin.

The market is increasingly demanding polyurethane products where the petrochemical raw materials have been to some extent or entirely replaced by materials from renewable sources. Sebacic acid is a renewable raw material which by way of example is obtained from vegetable oil (castor oil). However, sebacic esters exhibit crystallization which is undesired for many applications, and there are therefore many applications in which they cannot be used. By way of example, U.S. Pat. No. 5,695,884 discloses the use of polyester polyols based on sebacic acid for thermoplastic polyurethanes with high crystallinity. US 2006/0141883 A1 and US 2006/0121812 also describe the use of polyester polyols based on sebacic acid for polyurethanes for fibers with high melting point. WO 00/51660 A1 describes polyurethanes for coronary catheters, in which polyester polyols based on sebacic acid can be used; here again, adequate hardness is a requirement. US 2007/0161731 A1 and U.S. Pat. No. 6,395,833 B1 moreover disclose that sebacic acid can be used for producing polyester polyols for use in polyurethane chemistry.

In the invention, the total index of the TPU is preferably from 1.0 to 1.2. By virtue of the reaction with the isocyanate or with the isocyanate prepolymer, the molar mass of the TPU is reduced sufficiently to give appropriate proccessability. The number-average molar mass here immediately prior to the reaction with the PLA is preferably from 7500 g/mol to 75 000 g/mol.

The reaction in stage A) is preferably carried out at a temperature in the range from 150° C. to 230° C.

The reaction time in stage A) is preferably from 10 seconds to 100 seconds.

The introduction of the polylactide into the melt of the stage A) product, and the subsequent reaction, take place at a temperature below 190° C., and particularly preferably at a temperature of from 170° C. to 185° C. The temperature is preferably kept at values at which there is no onset of discoloration of the polylactide. However, the temperature should be markedly above the softening point of the polylactide and above the softening point of the stage A) product. It is preferable to carry out the type of intensive mixing that by way of example can be achieved with a reactive extruder.

The PLA reacts here with the isocyanate groups, thus producing covalent bonds in the blend. The result is an increase in molar mass, and this in turn improves properties.

After the reaction, the resultant blend is cooled and by way of example pelletized, directly molded, or converted to a form suitable for further processing.

The proportion of isocyanate groups in the stage A) product is from 0.1% by weight to 5% by weight, preferably from 0.3% by weight to 3% by weight.

The process of the invention uses no polyols in stages A) to C), and there is therefore no construction of a TPU from polyol and diisocyanate. The specific aim of the reaction in stage A) is to reduce the molar mass of the TPU and to increase the content of isocyanate groups.

The reaction in stage B) is preferably carried out within a period of from 10 seconds to 180 seconds.

The invention therefore also provides a blend which can be produced by processes described above.

The blends of the invention can be used for any desired suitable applications. They are particularly used for producing foils (sheet products) or moldings.

In the invention, it is possible to use the blends to produce very thin foils, and it is therefore possible to achieve good biodegradability with use of appropriate monomers. This can be advantageous in particular for trash bags, plant bags, agricultural foils, and mulch foils, etc.

The polylactides that can be used in the invention comprise any of the suitable polylactides. Polylactides are also termed polylactic acids. They are polyhydroxy acids. PLA materials derive from a polycondensation reaction based on lactic acid or from a ring-opening polymerization reaction based on lactide, which is the cyclic dimer of two lactic acid modules. Polylactides are typically produced via ring-opening polymerization of lactide. The reaction is typically carried out at temperatures of from 140° C. to 180° C., with addition of catalytic tin compounds. It is possible to obtain polylactides with high molar mass and high strength.

Lactic acid itself can be produced via fermentation of molasses or via fermentation of glucose, with the aid of various bacteria. Lactides are produced via dimerization of lactic acid. It is also possible to produce high-molecular-weight polylactides directly from lactic acid by polycondensation.

The blends of the invention, which usually take the form of pellets, can be processed by the usual processes of injection molding and extrusion. When the blends that can be produced by the process of the invention are used in applications in the form of foils (sheet products), preferably for producing coatings, bellows, moldings, floors for buildings and the transport sector, cables, cable plugs, cable sheathing, cushions, laminates, nonwovens, seals, profiles, drive belts, rollers, saddles, foams, hoses, shoe soles, drag cables, solar modules, cladding in automobiles, wiper blades, or fibers, they exhibit the advantages described in the introduction. Shaping to give moldings/parts and to semifinished products can also take place in direct conjunction with the compounding step, in the form of a single-stage process, e.g. using an injection-molding compounder (IMC). Another preferred production process is calendering, powder sintering, or extrusion. Appropriate fiber-reinforced compounded materials are composed of the above blends and fibers.

EXAMPLES

The examples below provide further explanation of the invention. Individual components used in the examples described below are termed component Ki, where the letter i is a placeholder for a numeral.

Example 1

Component K1: TPU 1 Elastollan® LP 9273

Aliphatic polyester TPU based on butanediol hexanediol adipate with number-average molar mass 2.2 kg/mol, 1,6-hexanediol, and hexane diisocyanate. Comprising stabilizers (UV absorbers, HALS compounds, antioxidants, hydrolysis stabilizers) and processing aids (lubricants, waxes) in conventional concentrations. The TPU, in the form of pellets, is subjected to forming by injection molding to give test plaques, and test specimens are stamped out from these. The following features are measured on said test specimens.

| Feature | Unit | Values | Test method based on |
| --- | --- | --- | --- |
| Hardness | Shore A | 84 | DIN 53505 |
| Density | g/cm$^3$ | 1.14 | DIN EN ISO 1183-1-A |
| Tensile strength | MPa | 18 | DIN 53504-S2* |
| Elongation at break | % | 750 | DIN 53504-S2* |
| Tear-propagation resistance | N/mm | 50 | DIN ISO 34-1Bb |
| Notched impact resistance (Charpy) | | | |
| +23° C. | kJ/m$^2$ | no fracture | DIN EN ISO 179-1 |
| −30° C. | kJ/m$^2$ | no fracture | DIN EN ISO 179-1 |
| Compression set at room temperature | % | 36 | DIN ISO 815** |
| Compression set at 70° C. | % | 39 | DIN ISO 815** |

The test plaques were injection-molded from pellets with less than 0.02% water content. The test plaques were heat-conditioned at 100° C. for 20 hours. The test specimens were stamped from test plaques of thickness 2 mm* and 6 mm**. The test was carried out at 23±2° C. and at rel. humidity of 50±6%.

Example 2

Component K2: TPU2 Elastollan® B 85 A 15

Aromatic polyester-TPU based on butanediol adipate with number-average molar mass 2.4 kg/mol, 1,4-butanediol, and methyldiphenyl diisocyanate. Comprising hydrolysis stabilizers and processing aids in conventional concentrations. The TPU, in the form of pellets, is subjected to forming by injection molding to give test plaques, and test specimens are stamped out from these. The following features are measured on said test specimens.

| Feature | Unit | Values | Test method based on |
| --- | --- | --- | --- |
| Hardness | Shore A | 83 | DIN 53505 |
| Density | g/cm$^3$ | 1.20 | DIN EN ISO 1183-1-A |
| Tensile strength | MPa | 55 | DIN 53504-S2* |
| Elongation at break | % | 600 | DIN 53504-S2* |
| Tensile stress at 20% tensile strain | MPa | 2 | DIN 53504-S2* |
| Tensile strain at 100% tensile strain | MPa | 4 | DIN 53504-S2* |
| Tensile stress at 300% tensile strain | MPa | 15 | DIN 53504-S2* |
| Modulus of elasticity from tensile test | MPa | | DIN EN ISO 527 |
| Tear-propagation resistance | N/mm | 75 | DIN ISO 34-1Bb |
| Abrasion | mm$^3$ | 35 | DIN ISO 4649-A |
| Compression set at room temperature | % | 25 | DIN ISO 815** |
| Compression set at 70° C. | % | 35 | DIN ISO 815** |
| Tensile strength on storage in water at 80° C. for 21 days | MPa | 40 | DIN 53504-S2* |
| Tensile strain at break on storage in water at 80° C. for 21 days | % | 600 | DIN 53504-S2* |
| Notched impact resistance (Charpy) | | | |
| +23° C. | kJ/m$^2$ | no fracture | DIN EN ISO 179-1 |
| −30° C. | kJ/m$^2$ | no fracture | DIN EN ISO 179-1 |

The test plaques were injection-molded from pellets with less than 0.02% water content. The test plaques were heat-conditioned at 100° C. for 20 hours. The test specimens were stamped from test plaques of thickness 2 mm* and 6 mm**. The test was carried out at 23±2° C. and at rel. humidity of 50±6%.

Example 3

Component K3: TPU3 Elastollan® C 78 A 10

Aromatic polyester-TPU based on butanediol hexanediol adipate with number-average molar mass 2.4 kg/mol, 1,4-butanediol, and methyldiphenyl diisocyanate. Comprising hydrolysis stabilizers in conventional concentrations. The TPU, in the form of pellets, is subjected to forming by injection molding to give test plaques, and test specimens are stamped out from these. The following features are measured on said test specimens.

| Feature | Unit | Values | Test method based on |
| --- | --- | --- | --- |
| Hardness | Shore A | 80 | DIN 53505 |
| Density | g/cm$^3$ | 1.18 | DIN EN ISO 1183-1-A |
| Tensile strength | MPa | 50 | DIN 53504-S2* |
| Tensile strain at break | % | 650 | DIN 53504-S2* |
| Stress at 20% tensile strain | MPa | 2 | DIN 53504-S2* |
| Stress at 100% tensile strain | MPa | 4 | DIN 53504-S2* |
| Stress at 300% tensile strain | MPa | 7.5 | DIN 53504-S2* |
| Tear-propagation resistance | N/mm | 60 | DIN ISO 34-1Bb |

-continued

| Feature | Unit | Values | Test method based on |
|---|---|---|---|
| Abrasion | mm³ | 30 | DIN ISO 4649-A |
| Compression set at room temperature | % | 25 | DIN ISO 815** |
| Compression set at 70° C. | % | 35 | DIN ISO 815** |
| Tensile strength on storage in water at 80° C. for 21 days | MPa | 35 | DIN 53504-S2* |
| Tensile strain at break on storage in water at 80° C. for 21 days | % | 650 | DIN 53504-S2* |
| Notched impact resistance (Charpy) | | | |
| +23° C. | kJ/m² | no fracture | DIN EN ISO 179-1 |
| −30° C. | kJ/m² | no fracture | DIN EN ISO 179-1 |

The test plaques were injection-molded from pellets with less than 0.02% water content. The test plaques were heat-conditioned at 100° C. for 20 hours. The test specimens were stamped from test plaques of thickness 2 mm* and 6 mm**. The test was carried out at 23±2° C. and at rel. humidity of 50±6%.

Example 4

Component K4: PLA1

The selected poly-D,L-lactide (PLLDA) derived from a ring-opening polymerization reaction using an L-lactide fraction of about 92% and a D-lactide fraction of about 8%. The selected type of polylactide is characterized by the following physical properties:

| | | | |
|---|---|---|---|
| Zero-shear viscosity at 180° C. | Pa * s | DIN 1342-1* | 3000 |
| Tensile strain at F__max | MPa | EN ISO 527-2/1A/50 | 68 |
| Stress at F__max | % | EN ISO 527-2/1A/50 | 4.4 |
| Breaking strength | MPa | EN ISO 527-2/1A/50 | 58 |
| Tensile strain at break | % | EN ISO 527-2/1A/50 | 7 |
| Modulus of elasticity | MPa | EN ISO 527-2/1A/50 | 1770 |
| Notched impact resistance | kJ/m² | DIN EN ISO 179-1 | 7 |

*Zero-shear viscosity: measured with a Rheometrics SR 200 rotary rheometer

Example 5

Component K5: Prepolymer 1

Lupranat® MP102; Prepolymer based on diphenyl-methane 4,4'-diisocyanate (MDI), dipropylene glycol, and on a polyetherdiol based on ethylene oxide/propylene oxide, with molar mass 450 g/mol. The prepolymer can be added in the form of a liquid at room temperature.

| | | |
|---|---|---|
| NCO content: | 23.0% | |
| Viscosity at 25° C. | 650 mPa * s | to DIN 53018 |
| Density at 25° C. | 1.21 | to DIN 51757 |

Example 6

Component K6: Isophorone diisocyanate uretdione butanediol adduct VESTAGON BF 1540

A crosslinking agent which is used for powder coatings and which takes the form of flakes with melting point from 105-115° C., density 1.07 g/cm³, and retrocleavage temperature from 130-160° C.

Example 7

Compounding Process 1 to Produce the PLA/TPU Blend of the Invention

The PLA/TPU blends prepared and characterized in examples 10 to 12 were produced via a Coperion ZSK 25 corotating twin-screw extruder, L/D=40, manufacturer: Werner & Pfleiderer. The compounding assembly was operated in all preparation processes with a screw rotation rate n=100 min$^{-1}$ and a total throughput m=5.0 kg/h. The temperature profile along the extruder axis can also be found in FIG. 1. The barrel temperatures set for zones 1 to 10 are: 180°, 200°, 200°, 200°, 200°, 180°, 180°, 180°, 180°, 180° C.

The respective type of TPU (K1 or K2 or K3), and also the respective additive (K6), or the modified MDI (K5), was introduced with gravimetric metering into the feed aperture of the twin-screw extruder. Modification of the TPU takes place in extruder zones 2 to 5. The PLA pellets (K4) are added to the feed aperture of zone 6. The processes taking place in the subsequent zones are PLA plastification, intensive mixing of the components, and also the coupling reaction to give the covalent phase linkage. The strands of compounded material discharged are cooled and then pelletized.

Example 8

Production of Test Specimens

Tensile specimens to DIN EN ISO 527-2, and also test specimens for determining notched impact resistance to DIN EN ISO 179-1, were produced in a mold, by injection molding. An Arburg 220 M 350-90 reciprocating-screw injection-molding machine was available for this purpose. The machine parameters and process parameters were as follows:
maximum clamping force=220 kN
screw geometry: D=20 mm, L/D=25 (three-zone screw)
flight depth ratio 2:1
Arburg 220 M temperature profile; constant 180° C.
mold temperature 30° C.

Example 9

Test Procedure

All of the tensile tests were carried out to DIN 53 504 at a testing speed of 50 mm/min. The dimensions of the test specimen used for determining notched impact resistance are as follows:

| | Length [mm] | Width [mm] | Thickness [mm] | Depth of notch [mm] |
|---|---|---|---|---|
| Type 1 | 80 | 10 | 4 | 2 |

Example 10

Characterization of Blend 1:

PLA1 with TPU1, with addition of 3% of isopherone diisocyanate (K6), produced by process 1. The ratio of the main components was varied from 90:10 to 50:50. Table 4 comprises the mechanical properties determined.

TABLE 4

Mechanical properties of the PLA1/TPU1 blends

| Feature | Unit | Constitution of PLA/TPU blend | | | | |
|---|---|---|---|---|---|---|
| | | 90/10 | 80/20 | 70/30 | 60/40 | 50/50 |
| Modulus of elasticity | MPa | 1500 | 1200 | 1000 | 700 | 400 |
| Tensile strength | MPa | 55 | 47 | 38 | 30 | 25 |
| Tensile strain at break | % | 10 | 25 | 50 | 80 | 300 |
| Notched impact resistance | kJ/m$^2$ | 10 | 22 | 65 | 85 | 92 |

Example 11

Characterization of Blend 2:

PLA1 with TPU2, with addition of 10% of prepolymer 1 (K5), produced by process 1. The ratio of the main components was varied from 70:30 to 50:50. Table 5 comprises the mechanical properties determined.

TABLE 5

Mechanical properties of the PLA1/TPU2 blends

| Feature | Unit | Constitution of PLA/TPU blend | | |
|---|---|---|---|---|
| | | 70/30 | 60/40 | 50/50 |
| Modulus of elasticity | MPa | 950 | 800 | 520 |
| Tensile strength | MPa | 35 | 33 | 29 |
| Tensile strain at break | % | 110 | 180 | 400 |
| Notched impact resistance | kJ/m$^2$ | 100 | 140 | 140 |

Example 12

Characterization of Blend 3:

PLA1 with TPU3, with addition of 5% of prepolymer 1 (K5), produced by process 1. The ratio of the main components was varied from 70:30 to 50:50. Table 6 comprises the mechanical properties determined.

TABLE 6

Mechanical properties of the PLA1/TPU3 blends

| Feature | Unit | Constitution of PLA/TPU blend | | |
|---|---|---|---|---|
| | | 70/30 | 60/40 | 50/50 |
| Modulus of elasticity | MPa | 1000 | 800 | 500 |
| Tensile strength | MPa | 35 | 33 | 32 |
| Tensile strain at break | % | 80 | 120 | 350 |
| Notched impact resistance | kJ/m$^2$ | 102 | 142 | 155 |

Example 12

The marked lowering of the modulus of elasticity resulting from production of the blend is apparent from tables 1 to 6. At the same time, tensile strain at break and notched impact resistance increase dramatically. All aspects of the object are therefore achieved.

The invention claimed is:

1. A process for producing a polylactide composition, the composition comprising:
   a polylactide phase; and
   a thermoplastic polyurethane phase;
   wherein the process comprises:
   A) reacting a thermoplastic polyurethane with a co-reactant of at least one of a diisocyanate and a isocyanate prepolymer having at least two isocyanate groups, in a melt phase to obtain a melt of a thermoplastic polyurethane having a reduced molar mass relative to the thermoplastic polyurethane prior to the reaction and having an excess of isocyanate end groups;
   B) adding at least one polylactide into the melt obtained in A), and reacting the polylactide with the thermoplastic polyurethane having reduced molar mass and excess isocyanate groups at a temperature below 190° C., to form covalent bonds with the isocyanate groups; and
   C) cooling of the resultant composition,
   with the proviso that no polyol is added to any of A) to C).

2. The process according to claim 1, wherein an amount of the polylactide in the B) melt is from 50 to 97% by weight.

3. The process according to claim 1 or 2, wherein, an amount of the co-reactant is from 1 to 25% by weight of the A) melt.

4. The process according to claim 1, wherein a content of isocyanate groups in the A) melt is from 0.1 to 5% by weight.

5. The process according to claim 1, wherein
   A) and B) are conducted continuously as a reactive extrusion process in an extruder,
   the thermoplastic polyurethane and the co-reactant are added at an inlet of the extruder, and
   the polylactide is added downstream from the inlet.

6. A polylactide composition, comprising:
   a polylactide phase; and
   a thermoplastic polyurethane phase;
   wherein the composition is obtained by the process according to claim 1.

7. A method for producing sheet products or moldings, comprising forming the sheet product or molding with a composition comprising the polylactide composition according to claim 6.

8. A sheet product or molding comprising the polylactide composition according to claim 6.

9. A fiber-reinforced compounded material mixture comprising the polylactide composition according to claim 6 and fibers.

10. A sheet product, molding, or semifinished product which is formed with the compounded material mixture according to claim 9.

11. The composition according to claim 6, wherein the polylactide phase is a continuous phase and the thermoplastic polyurethane is a disperse phase.

12. The composition according to claim 6, wherein the thermoplastic polyurethane is obtained by reaction of components which include renewable raw materials.

13. The composition according to claim 12, wherein the renewable raw material is sebacic acid.

14. The composition according to claim 6, wherein the thermoplastic polyurethane is obtained by reaction of components which consist of nonaromatic components.

* * * * *